United States Patent [19]
Fukumoto et al.

[11] Patent Number: 5,835,643
[45] Date of Patent: *Nov. 10, 1998

[54] WAVEGUIDE INPUT/OUTPUT DEVICE

[75] Inventors: Shinji Fukumoto, Nara; Naoki Nishida, Osaka, both of Japan

[73] Assignee: Minolta Co., Ltd., Osaka, Japan

[ * ] Notice: This patent issued on a continued prosecution application filed under 37 CFR 1.53(d), and is subject to the twenty year patent term provisions of 35 U.S.C. 154(a)(2).

[21] Appl. No.: 714,362

[22] Filed: Sep. 16, 1996

[30] Foreign Application Priority Data

Sep. 29, 1995 [JP] Japan .................................. 7-252616

[51] Int. Cl.$^6$ .................................................. G02F 1/335
[52] U.S. Cl. ................................. 385/7; 385/31; 385/36; 385/37; 359/574; 359/575
[58] Field of Search .................................. 385/2, 4, 7, 10, 385/11, 37, 31, 32, 36; 359/569, 573, 574, 575

[56] References Cited

U.S. PATENT DOCUMENTS

| | | | |
|---|---|---|---|
| 4,799,750 | 1/1989 | Miyawaki | 385/7 |
| 4,929,042 | 5/1990 | Hatori et al. | 385/7 |
| 4,961,632 | 10/1990 | Hatori et al. | 385/7 |
| 5,315,676 | 5/1994 | Sunagawa | 385/37 |

FOREIGN PATENT DOCUMENTS

| | | |
|---|---|---|
| 60-111220 | 6/1985 | Japan . |
| 01-107213 | 4/1989 | Japan . |

*Primary Examiner*—Hemang Sanghavi
*Attorney, Agent, or Firm*—Burns, Doane, Swecker & Mathis, LLP

[57] ABSTRACT

A waveguide input/output device for input and output of laser light L into a thin-film waveguide 2 via an input grating or prism 7 and an output or emission grating 8. The height of the emission grating 8 is gradually increased in a travel direction of a light advancing through the waveguide and either the height of the input grating 7 or the height of the output grating 8 is gradually increased in the direction of propagation of the service elastic waves in the waveguide 3 generated by a transducer element 3.

13 Claims, 3 Drawing Sheets

WAVEGUIDE INPUT/OUTPUT DEVICE

BACKGROUND OF THE INVENTION

1. Field of the Invention

The present invention relates to a waveguide input/output device, and, more specifically, relates to a waveguide input/output device for use with optical modulators and optical switches of optical computers; optical switches, optical branching filters, and optical modulators of optical communications equipment; optical deflectors; and optical modulators of laser printers, copiers, scanners and the like.

2. Description of the Related Art

Various waveguide input/output devices have been proposed which use acousto-optic deflection elements of a waveguide type. These acousto-optic deflection elements utilize well-known art to deflect light transmitted through a thin film waveguide (hereinafter referred to as "guided light") by acousto-optic interaction with a surface elastic wave transmitted through the waveguide (i.e., Bragg diffraction).

Waveguide input/output devices require the intensity distribution of the light emitted from the device to have a Gaussian distribution. If the intensity distribution of the light emitted from the device is not a Gaussian distribution, focusing characteristics are adversely affected because the light cannot be condensed to a fine spot by a posteriorly arranged focusing unit. A gradual increase of the height of the emission grating in the direction of travel of the guided light has been proposed as a countermeasure in, for example, Japanese Unexamined Patent Application No. SHO 60-111220. Furthermore, a comb-line electrode pair arranged at a center position in the widthwise direction of the guided light has been disclosed in Japanese Unexamined Patent Application No. HEI 1-178918.

In the waveguide input/output device disclosed in Japanese Unexamined Patent Application No. SHO 60-111220, although the intensity distribution of the emitted light in the direction of travel of the guided light (hereinafter referred to as "guided direction") is a Gaussian distribution, the intensity distribution of the emitted light in the propagation direction of the surface elastic wave (i.e., a direction perpendicular to the guided direction) is not a Gaussian distribution. Therefore, optimum condensing characteristics cannot be obtained. In the case of a waveguide input/output device using acousto-optic deflection elements of a waveguide type, there is a propagation loss of the surface elastic waves, such that the intensity distribution of emission light in a direction perpendicular to the guided direction requires a Gaussian distribution.

Similarly, in the device disclosed in Japanese Unexamined Patent Application No. HEI 1-178918, the intensity distribution of emission light in a direction perpendicular to the guided direction cannot be an accurate Gaussian distribution.

SUMMARY

An object of the present invention is to eliminate the previously described disadvantages.

Another object of the present invention is to provide a waveguide input/output device capable of improving the condensing characteristics of light emitted from the waveguide input/output device.

A further object of the present invention is to provide a waveguide input/output device wherein the intensity distribution of light emitted from the device is a Gaussian distribution in the direction of propagation of the surface elastic waves.

A still further object of the present invention is to provide a waveguide input/output device using acousto-optic deflection elements of a waveguide type, wherein the intensity distribution of light emitted from the device is a Gaussian distribution in the direction of propagation of the surface elastic waves and the direction of travel of the guided waves.

These and other objects are attained by a waveguide input/output device which accomplishes the input/output of laser light to a waveguide via input and output gratings, wherein the height of the emission or output grating gradually increases in the travel direction of the light advancing through the waveguide, and either the height of individual elements of the input grating or the height of individual elements of the output grating gradually increases in the direction of propagation of the surface elastic waves.

These objects are attained by a waveguide input/output device comprising a waveguide, an input grating provided at the area where light is input into the waveguide and having a gradually increasing height in the direction of propagation of surface elastic waves, and an output grating provided at the area where light is output from the waveguide and having a gradually increasing height in the direction of travel of light advancing through said waveguide.

These objects are further attained by a waveguide input/output device comprising a waveguide, and output grating provided at the area of light output from the waveguide and having a gradually increasing height in the direction of propagation of surface elastic waves, as well as a gradually increasing height in the direction of travel of light advancing through said waveguide.

These objects are further attained by a waveguide input/output device comprising a waveguide, an input grating located at a first position on the waveguide at an area where light is input into the waveguide, an output grating located at a second position on the waveguide at an area where light is output from the waveguide and having a gradually increasing height in the direction of travel of light advancing through said waveguide; and a transducer element located adjacent an area between the input grating and the output grating for generating surface elastic waves wherein either the height of individual elements of input grating or the height of individual elements of said output grating gradually increases in the direction of propagation of surface elastic waves generated by the transducer element.

BRIEF DESCRIPTION OF THE DRAWINGS

These and other objects and features of the present invention will become apparent from the following description of preferred embodiments thereof taken in conjunction with the accompanying drawings, in which.

In the following description, like parts are designated by like reference numbers throughout the several drawings.

DETAILED DESCRIPTION

The preferred embodiments of the waveguide input/output device of the present invention are described hereinafter with reference to the accompanying drawings.

Figure 1:
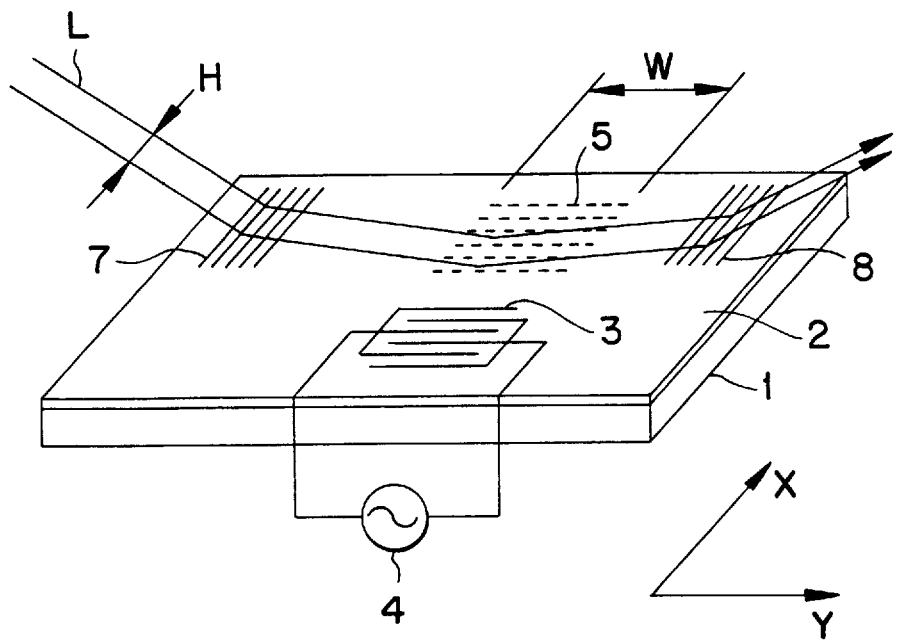
FIG. 1 is a perspective view of an embodiment of the waveguide input/output device of the present invention.

As shown in FIG. 1, the waveguide input/output device uses acousto-optic deflection elements of a waveguide type and, briefly, comprises a substrate 1, a thin film waveguide 2 formed on the substrate 1, a transducer 3, a signal generating means 4, an input grating 7, and an output grating 8.

The thin film waveguide 2 is formed of a piezoelectric element material, e.g., ZnO, LiNbO$_3$ or the like. The thin film waveguide 2 is formed on the substrate 1 by laser ablation, spattering, chemical vapor deposition (CVD) or like means. The transducer 3 is an interdigital transducer and is arranged anteriorly to the center portion of the thin film waveguide 2. When a high frequency signal generated by the signal generating means 4 is applied, the transducer 3 excites a surface elastic wave in the thin film waveguide 2. The signal generating means 4 is, for example, a voltage-controlled oscillator (VCO).

The input grating 7 and the output grating 8 are arranged on opposing sides of thin film waveguide 2. The input grating 7 inputs guided light L emitted from a light source into the thin film waveguide 2. Output grating 8 outputs the guided light L travelling through the thin film waveguide 2 to the exterior of the waveguide 2. Individual elements of these gratings 7 and 8 are disposed at a constant pitch on the thin film waveguide 2. The materials of the gratings 7 and 8 may be, for example, materials identical to those used to form the thin film waveguide 2. The gratings 7 and 8 are formed by methods such as electron beam imaging, photolithography, double beam interferometer and the like.

The configurations of the input and output gratings 7 and 8 are described below.

Figure 2A:
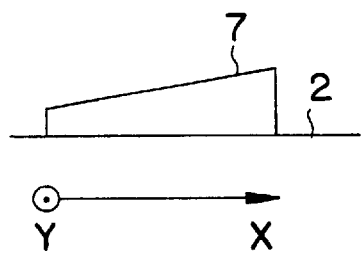
FIG. 2(a) is a side view showing the configuration of the input grating.
Figure 2B:
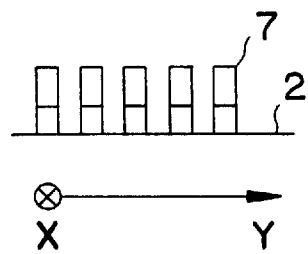
FIG. 2(b) is a front view showing the configuration of the input grating.

FIG. 2(a) is a side view of the input grating 7, and FIG. 2(b) is a front view of the same. The input grating 7 has a rectangular cross-sectional configuration. The height of the input grating 7 is uniform in the guided direction (Y direction), and gradually increases in the direction of propagation of the surface elastic waves 5, i.e., in a direction perpendicular to the guided direction and away from the transducer 3. Thus, the intensity distribution of the light output from the device is a Gaussian distribution in a direction perpendicular to the guided direction (i.e., in the direction of propagation of the surface elastic waves 5).

Figure 3:
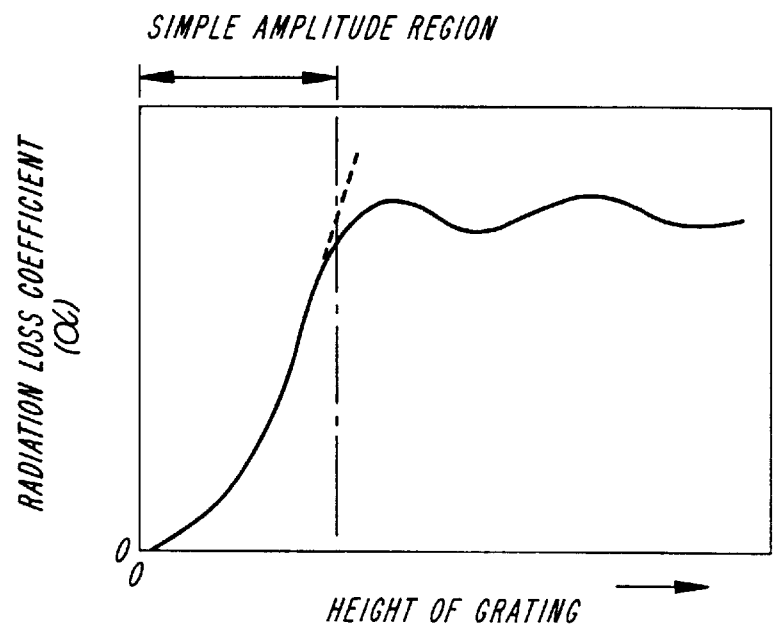
FIG. 3 is a graph showing the relationship between the grating height and the radiation loss coefficient.

A more detailed discussion follows. The intensity of the guided light L emitted from a light source is a Gaussian distribution in a direction perpendicular to the guided direction. On the other hand, the grating radiation loss coefficient (coupling efficiency) is dependent on the height of the grating as shown in FIG. 3. When the radiation loss coefficient is designated $\alpha$ and the height of the input grating 7 is designated h, the following equation (1) is obtained in the simple amplitude region shown in FIG. 3.

$$\alpha = Ah^2 \text{ (where } A \text{ is a constant)} \tag{1}$$

A surface elastic wave 5 excited by the transducer 3 is attenuated as it propagates through the thin film waveguide 2 substantially linearly in a simple amplitude region, shown in FIG. 3. This attenuation of the surface elastic wave 5 is due to propagation loss determined by the thin film material. Because of this relative relationship, the axes of FIG. 3 are unlabeled. When the intensity of the surface elastic wave 5 propagated through thin film waveguide 2 is designated I, the initial intensity excited by the transducer 3 is designated $I_0$, the surface elastic wave loss coefficient determined by the material of the thin film waveguide 2 is designated B, and the propagation length from the transducer 3 is designated x, the following equation (2) is obtained.

$$I = I_0 \cdot e^{-Bx} \tag{2}$$

That is, the intensity I of the surface elastic wave 5 attenuates as an exponential function as the propagation length x increases.

When the diffraction efficiency of the guided light L by the surface elastic wave 5 is designated $\eta$, the intensity of the surface elastic wave 5 is designated I, and the width of the surface elastic wave 5 acousto-optically interacting with guided light L is designated W, the following equation (3) is obtained.

$$\eta = \sin^2\{C(I \cdot W)^{1/2}\} \text{(where } C \text{ is a constant)} \tag{3}$$

That is, the diffraction efficiency $\eta$ is reduced in relation to a reduction of the intensity I of the surface elastic wave 5.

In order to achieve a Gaussian distribution of the intensity distribution of light emitted from the device in a direction perpendicular to the guided direction, the diffraction efficiency $\eta$ and radiation loss coefficient $\alpha$ may be multiplied to obtain a normally constant value. Accordingly, the height h of the input grating 7 may be set so as to satisfy the equation $\eta \cdot \alpha = D$ (where D is a constant). That is, equation (4) can be derived from equations (1), (2), and (3).

$$\sin^2\{C(I_0 \cdot e^{-Bx} \cdot W)^{1/2}\} \cdot Ah^2 = D \quad h = D^{1/2}/[A \sin^2\{C(I_0 \cdot e^{-Bx} \cdot W)^{1/2}\}]^{1/2} \tag{4}$$

It can be understood from equation (4) that the height h of the input grating 7 may be gradually increased as the distance increases from the transducer 3 in the direction of propagation of the surface elastic wave 5, i.e., in a direction perpendicular to the direction of travel of the guided light L in this example.

The height h of the input grating 7 in a direction perpendicular to the guided direction is calculated using equation (4) and specific numeric values.

Figure 4:
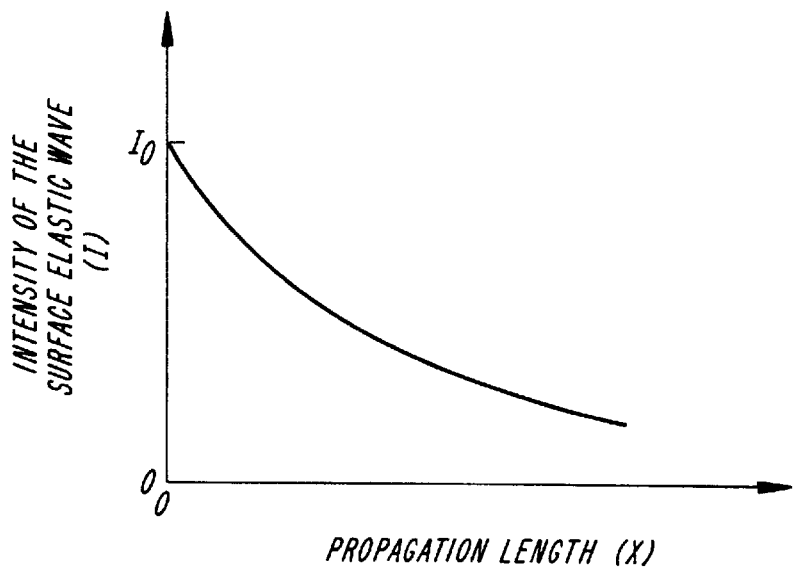
FIG. 4 is a graph showing the relationship between the propagation length and the intensity of the surface elastic waves.

The results of the intensity I of the surface elastic wave 5 compared with the propagation length x as shown in the graph of FIG. 4 were obtained under the following conditions. A glass substrate was used as the substrate 1 upon which was formed a ZnO thin layer, 1 $\mu$m in thickness, to form the thin layer waveguide 2. Aluminum was used as the material of the transducer 3. The distance between electrodes or electrode period was set at 2.5 $\mu$m, the width W of the transducer 3 was set at 0.5 mm, and the center frequency was set at 1 GHz. Zinc oxide (ZnO) was used for both the input grating 7 and the output grating 8, and the period thereof was set at 0.6 $\mu$m. The incidence angle of guided light L entering the input grating 7 was set at 66.2°. The guided light L had a wavelength of 0.633 µm, and was generated by an He—Ne laser using a TEO mode as the oscillation mode. The width H was set at 10 mm. The loss coefficient B of the surface elastic wave 5 was 75.5/m.

Although the maximum height h of the input grating 7 when the radiation loss coefficient α is in the monotonic increase region is 0.19 µm, the height h of the input grating 7 is set at 0.15 mm when the propagation length is 10 mm to allow for some tolerance. Equation (5) can be derived from equation (4).

$$h = 0.13 \cdot 10^{-6}/[\sin\{1.56(e^{-75.5x})^{1/2}\}] \text{(m)} \tag{5}$$

According to Equation (5), the height of the grating 7 is 0.13 µm when the propagation length x is 0 mm (zero). Therefore, the height h of the input grating 7 gradually increases from 0.13 µm to 0.15 µm as the distance increases from the transducer 3 in a direction perpendicular to the direction of travel of the guided light L.

Figure 5A:
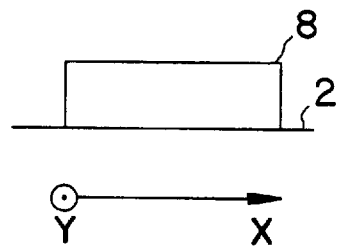
FIG. 5(a) is a side view showing the configuration of the output grating.
Figure 5B:
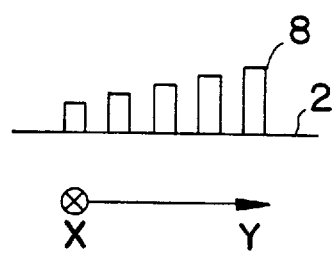
FIG. 5(B) is a front view showing the configuration of the output grating.

The configuration of the output grating 8 is described below. FIG. 5(*a*) is a side view of the output grating 8, and FIG. 5(*b*) is a front view of same. The output grating 8 has a rectangular cross section configuration. The height of the output grating 8 gradually increases in the guided direction, and is uniform in a direction perpendicular to the guided direction. Thus, the intensity distribution of light emitted from the device in the guided direction can be a Gaussian distribution.

A more detailed discussion follows. The intensity of the guided light L emitted from a light source is a Gaussian distribution in the guided direction. Assuming the height of the output grating 8 is constant in the guided direction, the radiation loss α (coupling efficiency) of the output grating 8 is uniform in the guided direction. Accordingly, the intensity of the guided light L is reduced as it travels, such that the intensity distribution of the light emitted from the device in the guided direction gradually decreases. As previously described, the grating radiation loss coefficient α is dependent on the height of the grating (refer to FIG. 3). That is, Equation (1) is obtained in the monotonic increase region shown for Example in FIG. 3. Therefore, when the intensity distribution of light emitted from the device in the guided direction is a Gaussian distribution, the height of the output grating 8 may be gradually increased in the direction of travel of the guided light L.

The waveguide input/output device of the present invention is not limited to the previously described embodiment and may be variously modified in that departing from the scope of the invention.

Figure 6A:
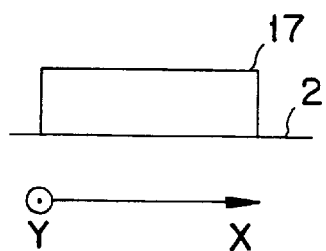
FIG. 6(a) is a side view showing the configuration of another embodiment of the input grating.
Figure 6B:
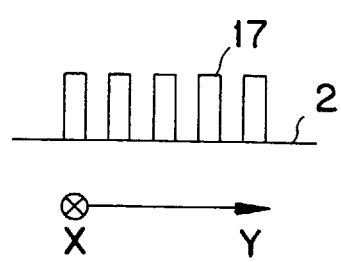
FIG. 6(b) is a front view showing the configuration of another embodiment of the input grating.
Figure 7A:
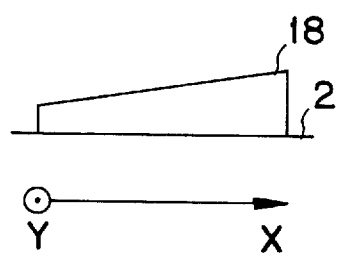
FIG. 7(a) is a side view showing the configuration of still another embodiment of the output grating.
Figure 7B:
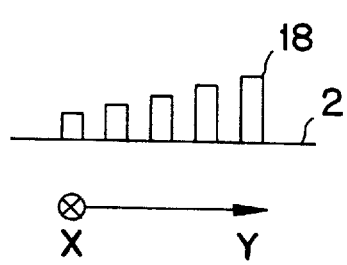
FIG. 7(b) is a front view showing the configuration of still another embodiment of the output grating.

The configuration of the grating need not necessarily be such that the height of the input grating gradually increases in a direction perpendicular to the direction of travel of the guided light, nor does the height of the output grating necessarily gradually increase in the direction of travel of the guided light, as described in the previous embodiment. As shown in FIGS. 6(*a*) and 6(*b*), and FIGS. 7(*a*) and 7(*b*), the height of the input grating 17 may be uniform in bilateral directions, and the height of the output grating 18 may gradually increase in the direction of travel of the guided light and in a direction perpendicular to direction of travel of guided light. In such circumstance, an input prism may be used in place of the aforesaid input grating 17.

The grating cross-sections are not restricted to rectangular configurations, and may alternatively be triangular, Gaussian or the like.

As can be readily understood from the preceding description of the present invention, the height of the output grating gradually increases in the direction of travel of light passing through a thin film waveguide, and either the height of the output grating or the height of the input grating gradually increases in the direction of propagation of the surface elastic waves, such that the intensity distribution of the light emitted from the device is a Gaussian distribution in the guided direction and in the direction of propagation of the surface elastic waves. As a result, the light can be condensed to a fine spot via a condensing optical unit disposed posteriorly to the waveguide input/output device, so as to improve condensing characteristics.

Although the present invention has been fully described by way of examples with reference to the accompanying drawings, it is to be noted that various changes and modifications will be apparent to those skilled in the art. Therefore, unless otherwise indicated, such changes and modifications do not depart from the scope of the present invention, and they should be construed as being included therein.

We claim:

1. A waveguide input/output device comprising:

a waveguide;

an input grating located at a first position on said waveguide at an area where light is input into said waveguide;

an output grating located at a second position on said waveguide at an area where light is output from said waveguide and having a gradually increasing height in the direction of travel of light advancing through said waveguide; and a transducer element located adjacent an area between said input grating and said output grating for generating surface elastic waves, wherein one of the height of individual elements of said input grating and the height of individual elements of said output grating gradually increases in the direction of propagation of surface elastic waves generated by said transducer element.

2. A waveguide input/output device according to claim 1, further comprising a signal generating means connected to said transducer element for driving said transducer element.

3. A waveguide input/output device according to claim 1 wherein individual elements of said input and said output gratings are disposed at a constant pitch on said waveguide.

4. A waveguide input/output device according to claim 1 wherein the height of said input grating is uniform in the direction of light advancing through said waveguide and is uniform in the direction of propagation of said surface of elastic waves.

5. A waveguide input/output device in accordance with claim 1 wherein the height of said output grating gradually increases in the direction of light advancing through said waveguide and the height of individual elements of said output grating gradually increases in the direction of said surface elastic waves.

6. A waveguide input/output device in accordance with claim 4 wherein said input grating is replaced by an input prism.

7. A waveguide input/output device in accordance with claim 5 wherein said input grating is replaced by an input prism.

8. A waveguide input/output device in accordance with claim 1 wherein said waveguide is a thin film waveguide.

9. A waveguide input/output device comprising:

a waveguide:

an input grating located at a first position on said waveguide at an area where light is input into said waveguide;

an output grating located at a second position on said waveguide at an area where light is output from said waveguide and having a gradually increasing height in the direction of travel of light advancing through said waveguide; and a transducer element located adjacent an area between said input grating and said output grating for generating surface elastic waves, wherein said input grating has a rectangular cross-section and the height of said input grating is uniform in the direction of light advancing through said waveguide and the height gradually increases in the direction of propagation of said surface elastic waves.

10. A waveguide input/output device comprising:

a waveguide:

an input grating located at a first position on said waveguide at an area where light is input into said waveguide;

an output grating located at a second position on said waveguide at an area where light is output from said waveguide and having a gradually increasing height in the direction of travel of light advancing through said waveguide; and a transducer element located adjacent an area between said input grating and said output grating for generating surface elastic waves, wherein the height of said input grating gradually increases in the direction of propagation of surface elastic waves generated by said transducer element, and wherein the height of said output grating has a rectangular cross-section and the height of said output grating gradually increases in the travel direction of light advancing through said waveguide and is uniform in a direction of propagation of said surface elastic waves.

11. A waveguide input/output device comprising:

a waveguide an input grating for inputting light into said waveguide;

an output grating for outputting light from said waveguide, wherein the height of said output grating gradually increases in the travel direction of light advancing through said waveguide, and one of the height of individual elements of said input grating and the height of individual elements of said output grating gradually increases in the direction of propagation of surface elastic waves in said waveguide.

12. A waveguide input/output device comprising:

a waveguide;

an input grating provided at an area where light is input into said waveguide and having individual elements which gradually increase in height in the direction of propagation of surface elastic waves in said waveguide; and an output grating provided at an area where light is output from said waveguide and having a gradually increasing height in the direction of travel of light advancing through said waveguide.

13. A waveguide input/output device comprising:

a waveguide; and output grating provided at an area where light is output from said waveguide and having individual elements which gradually increase in height in the direction of propagation of surface elastic waves, as well as a gradually increasing height in the direction of travel of light advancing through said waveguide.

* * * * *